J. S & D. Lake.

Mower.

No 9
No 1114

Reissued Jan. 1, 1861.

Witnesses
W. Yates Ashley
[illegible]

Inventor
Jesse S. Lake
David Lake
By their Attorney
Thos. H. Dodge.

Sheet. 2
2 Sheets

J. S & D. Lake.

Mower.

No 9
No 1114

Reissued Jan. 1, 1861.

Witnesses
H. Clarke Adee
[illegible]

Inventor
Jesse S Lake
David Lake
By their Attorney
Thos. H. Dodge

UNITED STATES PATENT OFFICE.

JESSE S. LAKE AND DAVID LAKE, OF SMITH'S LANDING, NEW JERSEY, ASSIGNORS TO JAMES A. SAXTON.

IMPROVEMENT IN GRASS-HARVESTERS.

Specification forming part of Letters Patent No. 9,137, dated July 20, 1852; Reissue No. 1,114, dated January 1, 1861.

*To all whom it may concern:*

Be it known that we, JESSE S. LAKE and DAVID LAKE, both of Smith's Landing, in the county of Atlantic and State of New Jersey, have invented certain new and useful Improvements in Mowing-Machines or Grass-Harvesters; and we do hereby declare the following to be a full, clear, and exact description thereof, reference being had to the accompanying drawings, forming a part of this specification, in which—

Figure 1:
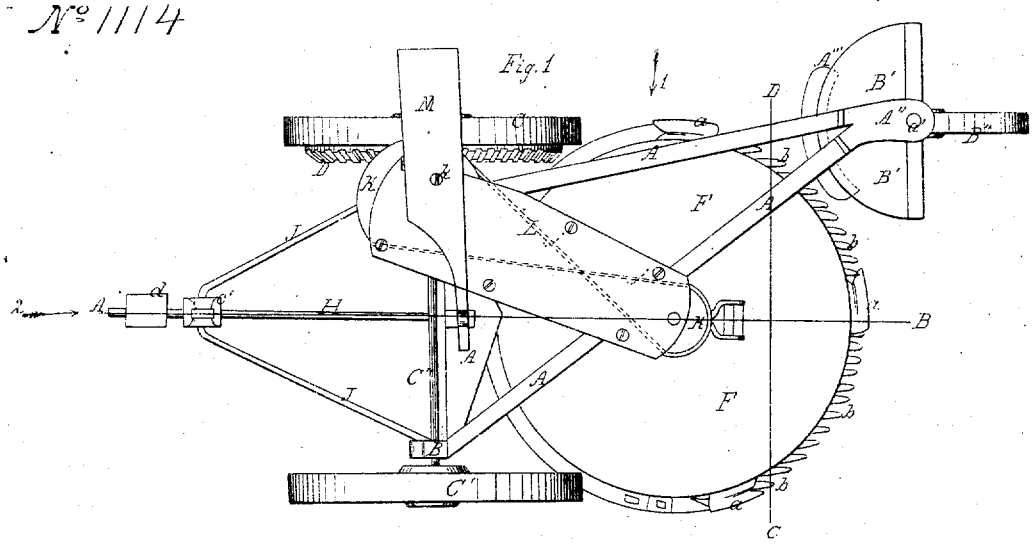
Figure 2:
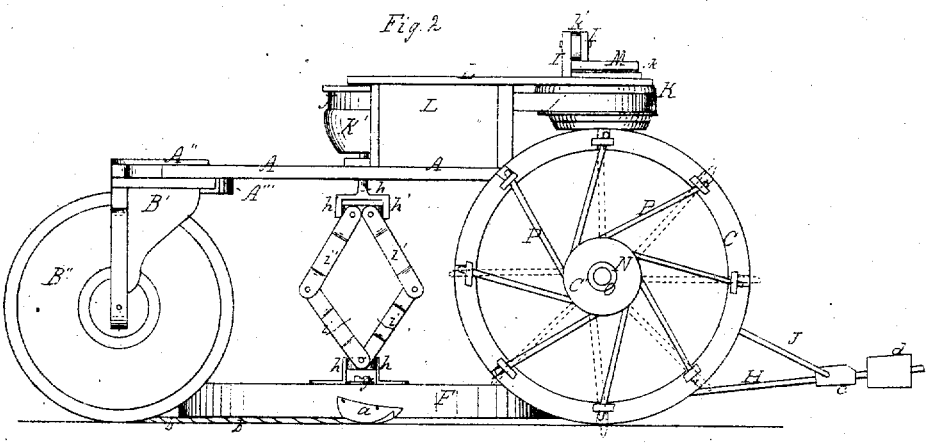
Figure 3:
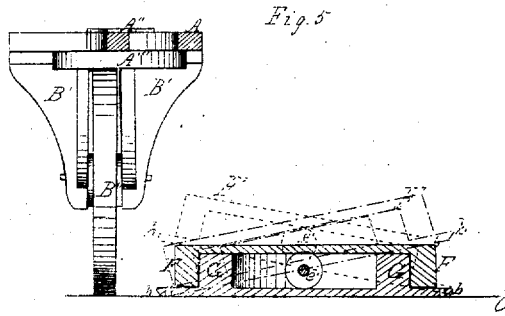
Figure 4:
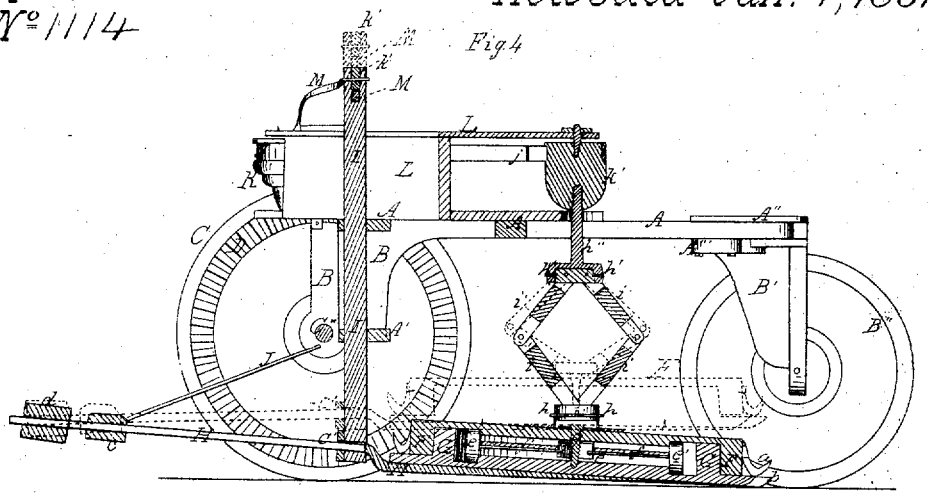
Figure 3:
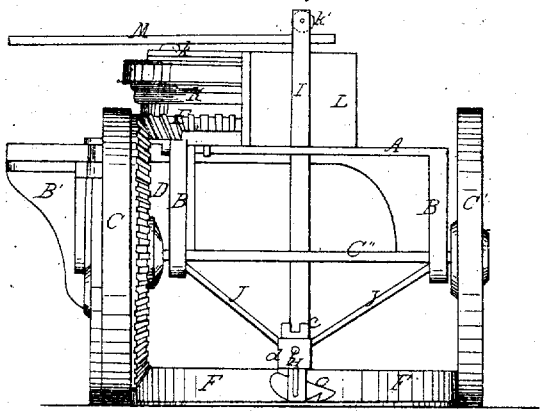
Figure 6:
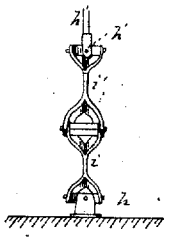
Figure 7:
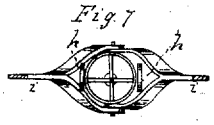

Figure 1 represents a plan view of a machine showing one mode of applying our said improvement. Fig. 2 represents a side view of the machine as seen in Fig. 1, looking in the direction of arrow 1, the machine being represented as reversed or facing in an opposite direction. Fig. 3 represents a portion of the frame, wheels, and cutting apparatus, looking in the direction of arrow 2. Fig. 4 represents a longitudinal section on line A B, Fig. 1, the cutting apparatus being shown in two positions, one in black and the other in red lines. Fig. 5 represents a cross-section on line C D, Fig. 1, looking in the direction of arrow 2, the parts G and F being shown in different positions in full and dotted red lines. Figs. 6 and 7 represent detached parts of the mechanism used to operate the cutting apparatus.

Whenever it may be expedient to use one or more of the several parts or branches of our improvements separate from the rest, such part or parts may be used in connection with any suitable frame and gearing, and it is obvious that several parts of our improvements are applicable to various other mowing-machines in use.

Mowing-machines as heretofore constructed have not carried their cutting apparatus in a manner or way that left it free enough to conform to the surface of uneven ground to mow grass with sufficient evenness on such ground.

That branch of our improvements which is the subject of this patent is designed to remedy this defect; and it consists in so attaching, combining, or fastening that part of a mowing-machine to which the guard-fingers are attached to the main frame or to an intermediate coupling-piece as that the fingers, or that part to which they are attached and by which they are sustained and supported, will be free to rise or fall bodily, and also to have a free lateral or wabbling motion to enable the cutting apparatus to conform freely to the undulations of the ground over which it is drawn independent of the up and down motions of the main frame.

In the accompanying drawings, A A A represent a triangular frame, the front end of which is supported by a swivel-wheel, B″, connected with the frame B′, which is pivoted to part A″ at *a*′, so that the wheel B″ and its frame B′ can freely turn either to the right or to the left, the upper rear circular part of frame B′ working under the front of the frame A and above a projection or lip of the part A‴. (Shown in dotted lines, Fig. 1.) The parts A″ and A‴ are rigidly secured to the front of frame A.

The rear end of the triangular frame A is supported by wheels C C′, connected by a common axle, C″, (wheel C′ being loose on the axle,) which has its bearings in downwardly-projecting pieces B B, the upper ends of the latter being rigidly united to the rear end of frame A and their lower ends by a cross-piece, A′. A sliding or coupling piece, I, plays loosely up and down in the mortises cut in the cross-piece A′ and in the rear piece of the main frame A.

To the lower end of sliding or coupling piece I is attached the finger support or platform G—that is, that part of a mowing-machine to which the guard-fingers are fastened. In the present instance it is constructed in a circular form, the guard-fingers *b* being fastened to the front edge, as shown in the drawings. The under side of the part G is cut out or grooved, so as to permit the iron lever or connection H to be fitted up into such groove, whereby the parts H and G are fastened rigidly together, and are flush on the bottom. The part H is bent or curved up in rear of the part G, as shown in the drawings, and is then passed through a hole or opening in the bottom of the piece I. The part H then extends back, passing through a guide-piece, *c*, and has a movable weight, *d*, on its rear end. The interior of the upper side of the part G is turned or cut out, as indicated by sections in Figs. 4 and 5. In this groove is arranged a friction device, consisting of a central ring, *e*, with radiating shafts, on the outer ends of which are rigidly attached the friction-rolls *e'*. A metal ring, *f*, is placed on top of the radiating shafts of the rolls *e'* for the purpose of steadying them when in operation. The rolls *e'* and ring *e* are kept in their proper position laterally by means of the form of the groove in the part G. (See Fig. 4.) The cutters *a* are in this instance fastened to the edge of a circular frame or wheel, F, the under inner side of which is turned or cut out so as to fit over the part G, as indicated in the drawings. The under side of the part F rests on the friction-rolls *e'*, which support it just high enough to allow the cutters *a* to run close to the top of the fingers *b*, but not to bear with too great friction thereon.

The wheel F turns on a stationary pivot, *g*, which is fast in the part G. A rapid rotary motion is communicated to wheel F, whereby the cutters *a* are caused to pass over the fingers *b* by means of the main gear D on the inside of the main driving-wheel C working in gear with pinion-wheel E, which has its bearings in frame L, and to which is attached pulley K, from which passes a band or belt, *j*, around pulley K', thereby giving motion to shaft *h''*, to the lower end of which a swivel piece or ring is hinged between ears *h' h'*, and to which the upper forked ends of two sets of jointed levers, *i i*, are hinged, as shown in the drawings, while the lower forked ends of levers *i i* are jointed to the upper forked ends of another set of forked levers, *i' i'*, whose lower forked ends are in turn hinged to a ring or swivel-piece pivoted between the ears *h h*, made fast to the top of wheel F, as shown in the drawings. The cutters *a* are formed of plates of steel, and are so made that they can be moved down as they wear away, so as to be always in close contact with the fingers *b*, over which they pass, to cut the grass as the machine advances.

When the machine is drawn forward by the team, which is to be attached in any proper manner to the swivel-frame B', motion is to be communicated from the main driving-wheel C to shaft *h''*, which in turn causes the double-jointed levers *i' i'* and *i i* to revolve, together with the part F, to which the cutters *a* are attached, while the part of the machine to which the fingers *b* are fastened is caused to slide forward over the ground by reason of the coupling-piece I being drawn forward against the curved part of the metallic connection or lever H, while the part G or finger-support is prevented from twisting laterally out of its proper position at the side of the machine by means of brace or jointed levers J J, which are pivoted or hinged to the lower ends of the pieces B B, and also to the guide-piece *c*, through which the rear of the metallic connection or lever H passes and is free to slide. A washer-piece, *c'*, is fastened to H just in rear of the piece I, whereby the lever H and finger-support G are kept in their proper position when the machine is backed.

In cutting grass on soft and slippery meadows, to prevent the driving-wheel from slipping, we hinge a series of arms, P, to the inside of a ring-piece, N, on the hub of the wheel C and pass their outer ends through guides in the periphery of the wheel C, so that by turning the plate N the arms P can be extended so as to take into the ground, as shown in red lines, or withdrawn, as shown in black. Plate N is kept in any desired position by means of nut O, which screws upon the end of shaft C'', the wheel C being made fast to said shaft. When the machine is in operation the team walks by the side of the grass to be cut, and wheel B'' runs just clear of the standing grass, while the cutting apparatus which projects laterally inward from the main frame cuts the grass, which is then carried by the action of the part F toward the main frame, and, finally, it is delivered or laid upon the ground just in rear of the wheel B'', so that a clear and unobstructed space is left for the passage of the beam, wheel B'', and driving-wheel C on the next round of the machine. In mowing on level ground the guard-fingers *b* are drawn over the ground in nearly a horizontal position, and as they enter the standing grass they hold and support it while the cutters *a* pass over them and sever the stalks of grass in an even manner; nor is the length of stubble much, if any, longer when the machine is cutting on uneven ground, for the finger-support, or that part to which the guide-fingers are attached and upon which the cutters are supported, can freely rock, roll, or wabble on a line at right angles to the line of motion of the machine, so as to conform to inequalities of the ground, as illustrated in red and dotted lines in Fig. 5. This is due to the fact that the metallic connection or lever H is free to turn in the coupling or sliding piece I. The front of the fingers *b* can also rise and fall in the arc of a circle the axis of which is in rear of the point where the grass is cut, and which is also at right angles to the line of motion of the machine. This is owing to the fact that the opening in the piece I is of such a size as to permit a free rocking motion to the lever H in a plane parallel to the line of motion of the machine. The cutting apparatus can also rise and fall bodily independent of the up-and-down motion of the main frame, since the coupling-piece I is free to slide or work up and down in the pieces A' and A.

It will thus be seen that our machine is capable of performing work which has never before been accomplished by a grass-cutter—viz., so carrying its guard-fingers as that they shall be free to rock, roll, or wabble laterally, and also to rise and fall in a horizontal or nearly horizontal plane, as above described, thus enabling the cutting apparatus to conform freely to the inequalities of the ground independently of the up and down motions of the main frame, whereby the usefulness of a grass-harvester is greatly increased.

In the top of the sliding piece I is a roller, *k'*, under which the end of lever M passes. This lever widens out at the other end, forming a seat for the driver, whose weight serves as a counterpoise or balance for the cutting apparatus, and by adjusting his position nearer to or farther from the fulcrum *k* he can cause the platform which supports the cutting apparatus to press with more or less weight on the stubble or ground. The finger-support can also be made to press with more or less force on the stubble or ground by changing the position of the movable weight *d* on the lever H.

It will be observed that by the use of the double-jointed levers *i i i' i'*, in combination with the mode of connecting them with the cutting apparatus and the shaft of pulley K', the cutters are operated at all times, although the cutting apparatus is so carried as to conform to the irregularities or inequalities of the ground independent of the up and down motions of the main frame or the main driving-wheel.

Having described one practical way in which that branch of our invention which forms the subject of this patent can be carried out, we wish it to be understood that we do not limit ourselves to any particular cutting apparatus, main frame, or mode of operating the cutting apparatus; but

What we claim under this patent as our invention is—

Attaching or fastening that part of a mowing-machine to which the guards or fingers which support and hold the grass while it is being severed by the cutter or cutters are attached to the main frame or to an intermediate coupling-piece, so that the guards or fingers, or that part to which they are attached and by which they are sustained and supported, will be free to rise or fall bodily, and also to have a lateral rolling or wabbling motion, to enable the cutting apparatus to conform freely to the undulations of the ground over which it is drawn independent of the up and down motions of the main frame.

In witness whereof we have hereunto subscribed our names.

JESSE S. LAKE.
DAVID LAKE.

In presence of—
JOHN T. LAKE,
HENRY W. ROBINSON.